US007250859B2

(12) United States Patent
Martin et al.

(10) Patent No.: US 7,250,859 B2
(45) Date of Patent: Jul. 31, 2007

(54) AUTOMATIC PANEL CONFIGURATION UPLOAD TO A CENTRAL STATION AUTOMATION SYSTEM

(75) Inventors: Christopher D. Martin, Plainview, NY (US); Richard H. Hinkson, Plainview, NY (US); Narine Boodoosingh, Ozone Park, NY (US); Kevin G. Piel, Ronkonkoma, NY (US)

(73) Assignee: Honeywell International, Inc., Morristown, NJ (US)

( * ) Notice: Subject to any disclaimer, the term of this patent is extended or adjusted under 35 U.S.C. 154(b) by 170 days.

(21) Appl. No.: 10/909,679

(22) Filed: Aug. 2, 2004

(65) Prior Publication Data

US 2006/0022820 A1 Feb. 2, 2006

(51) Int. Cl.
*G08B 1/08* (2006.01)
*G05B 15/02* (2006.01)

(52) U.S. Cl. .......................... 340/539.19; 340/539.16; 340/539.17; 340/506; 700/9

(58) Field of Classification Search .......... 340/539.19, 340/539.16, 539.17
See application file for complete search history.

(56) References Cited

U.S. PATENT DOCUMENTS

| | | | | |
|---|---|---|---|---|
| 4,951,029 | A * | 8/1990 | Severson | 340/506 |
| 5,917,405 | A * | 6/1999 | Joao | 340/426.17 |
| 6,943,681 | B2 * | 9/2005 | Rezvani et al. | 340/506 |
| 2003/0062997 | A1 * | 4/2003 | Naidoo et al. | 340/531 |

* cited by examiner

*Primary Examiner*—Donnie L. Crosland
(74) *Attorney, Agent, or Firm*—Scully, Scott, Murphy, Presser, P.C.

(57) ABSTRACT

A method and system for automatically uploading the configuration of a security system to a central station automation system via telephonic lines, long-range radio (e.g., cellular), or Internet. The end result is that the automation system has sufficient information regarding the type and configuration of the system installed at the protected premises to properly handle alarms reports from that system.

15 Claims, 2 Drawing Sheets

AUTOMATIC PANEL CONFIGURATION UPLOAD TO A CENTRAL STATION AUTOMATION SYSTEM

FIELD OF THE INVENTION

The present invention relates to the field of implementing and maintaining networked commercial and private security systems.

BACKGROUND OF THE INVENTION

Presently, security alarm central station operators manually enter subscriber account and system information into an automation system database. This subscriber information may include the security system type, number of zones, the type of occurrence is happening in each zone (e.g., burglary, fire, panic, etc . . . ), alpha descriptors that identify each zone (e.g., front door, garage door, etc. . . . ) and the reporting format and report codes expected for each zone. This manual data entry task is a tedious and time-consuming part of a central station's operations. Further, the manual data inputting method cannot guarantee that the entered data will match the data of the security system that is installed at an associated protected location.

The present invention will allow a security system at a protected location to automatically upload alarm security control panel configurations and subsequently pass that information onto the compatible automation system. For example, this transmittal of security panel data can be accomplished using Honeywell's MX8000 Digital Alarm Receiver, Honeywell's AlarmNet-i, or any other compatible device (e.g., a modem connected to port on an automation system). The result is that the automation system automatically receives and stores the exact security control panel configuration, including all zones, descriptors, and reporting codes.

SUMMARY OF THE INVENTION

The present invention relates to a method and system for automatically uploading the configuration of a security system to a central station automation system (e.g., via a telephone line, long-range radio or the Internet). The end result being that the automation system has sufficient information regarding the type and configuration of the system installed at the protected premises to properly handle alarms reports from that system.

An embodiment of the present invention relates to a method for automatically updating security control panel parameters. The method comprises the steps of determining at least one zone characteristic response type parameter and thereafter programming a security system control panel with the determined zone characteristic parameter. Next, the determined zone characteristic parameters are transmitted to a network interface. The network interface transmits the determined zone characteristic parameters to a central server, wherein the zone characteristics are stored in the central station server.

Another embodiment of the present invention relates to a system for automatic security control panel configuration upload. The system comprises a keypad that has a first processor, a speaker device and a display device. A security control panel is in communication with the keypad, wherein the security control panel comprises a memory means. A network interface is in communication with the security control panel and a central server.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION

Embodiments of the present invention are described below in detail. The disclosed embodiments are intended to be illustrative only, since numerous modifications and variations therein will be apparent to those of ordinary skill in the art. In reference to the drawings, like numbers will indicate like parts continuously throughout the views.

The present invention relates to a method of automatically uploading the configuration of a security system to a central station automation system via telephonic lines, long-range radio (e.g., cellular), or Internet. The end result is that the automation system has sufficient information regarding the type and configuration of the system installed at the protected premises to properly handle alarms reports from that system.

Figure 1:
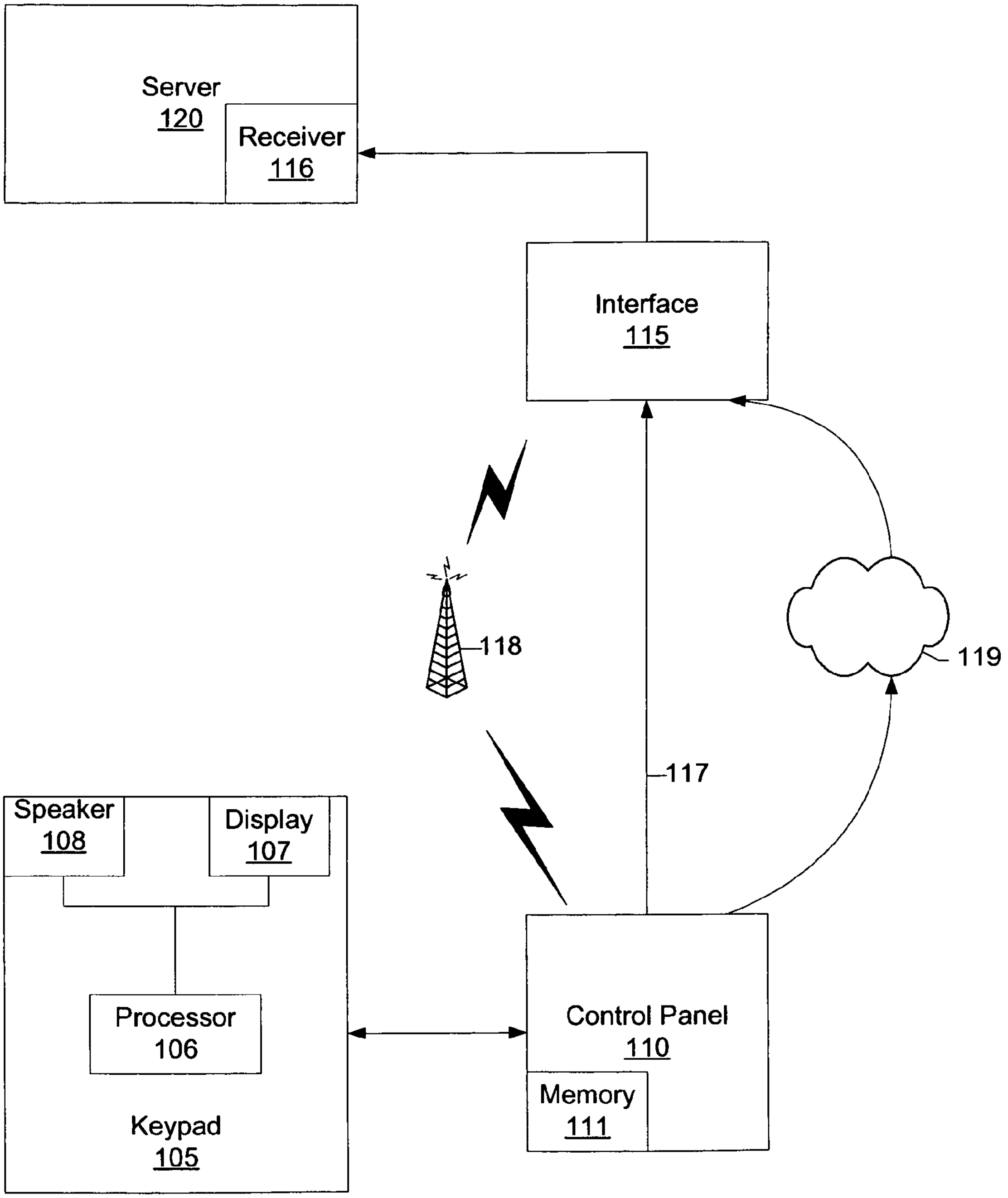
FIG. 1 is a diagram illustrating a system that relates to an embodiment of the present invention.

The present invention is initially described in reference to FIG. 1. FIG. 1 illustrates a system for automatic security control panel configuration upload. The system comprises a keypad 105; the keypad 105 has a first processor 106, a display device 107 for display messages to a system user and a speaker device 108 for broadcasting audible prompts to a system user. The system further comprises a security control panel 110 that has a memory means 111, wherein the security control panel being in communication with the keypad 105. A network interface 115 is in communication with the security control panel 110 and a central server 120.

To initiate the upload of the configuration data to the central automation system, a system operator enters a first authorization code into the keypad 105, wherein the processor 106 determines if the authorization code is valid. Upon determining that the first user authorization code is valid, the keypad 105 audibly (via speaker device 108) and visually (via display device 107) prompts the system user to enter zone characteristic parameters into the keypad 105.

Once the inputting of the zone characteristic parameters into the keypad is complete, the entered zone characteristics are transmitted from the keypad 105 to the security control panel 110 and saved within the memory means 111 of the security control panel 110. Next the operator is prompted with a query as to whether the entered zone parameter characteristics should be transmitted to the central station server. If the operator replies in the affirmative, then the operator is prompted to enter a second authorization code. Upon the determination that the second authorization code is valid, the security control panel 110 transmits the zone characteristic parameters to the network interface 115. Thereafter, network interface 115 transmits the acquired zone characteristic parameters to a central station server 120

As mentioned above, the examples of the network interface are Honeywell's MX8000 Digital Alarm Receiver, Honeywell's AlarmNet-i, or any other compatible device (e.g., a modem connected to port on an automation system). Further, the network interface 115 comprises a dedicated receiver 116 that is accessed via at least one of a dedicated telephonic connection 117, a cellular communication connection 118 and the Internet 119. The zone characteristic parameters include information pertaining to the security system type, number of security zones in a structure, definition of each security zone in a structure, alpha descriptors that describe each zone, a reporting format for each zone and a reporting code for each zone.

Figure 2:
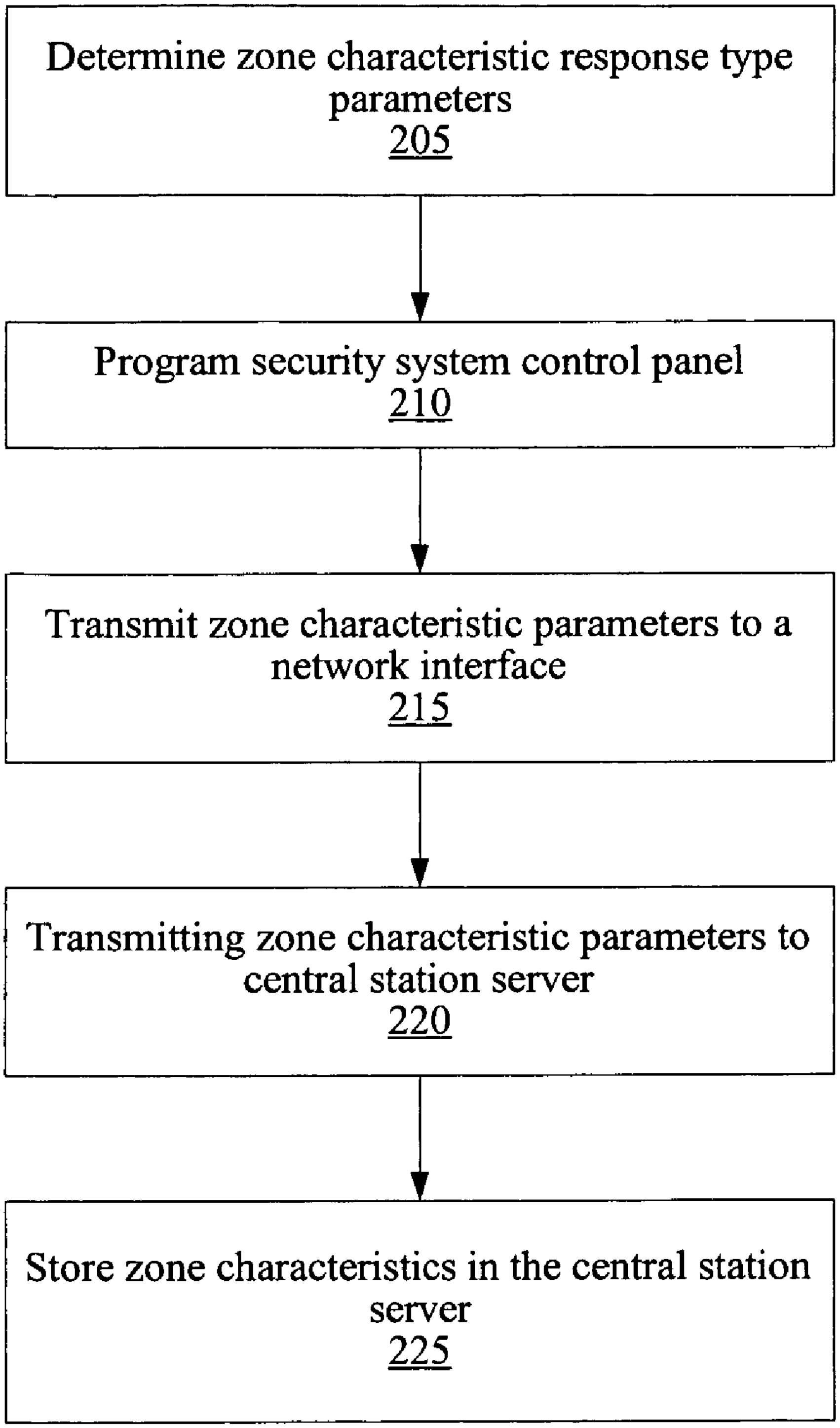
FIG. 2 is a flow diagram showing a method that relates to an embodiment of the present invention.

FIG. 2 is a flow diagram that shows a method for automatically updating security control panel parameters. At step 205, at least one zone characteristic response type parameter is determined. The security system control panel 110 is programmed at step 210 with the determined zone characteristic parameter(s) via the keypad 105. Next, at step 215, the determined zone characteristic parameters are transmitted to a network interface 115. The network interface 115 transmits the determined zone characteristic parameters to a central station server 120 at step 220. Lastly, at step 225, the zone characteristics are stored within the central station server 120.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed:

1. A method for automatically updating security control panel parameters, the method comprising the steps of:

determining at least one zone characteristic parameter;

programming a security system control panel with the determined zone characteristic parameter;

transmitting the determined zone characteristic parameters to a network interface;

transmitting the determined zone characteristic parameters to a central station server; and storing the zone characteristic parameters in the central station server.

2. The method of claim 1, wherein the step of programming the security system control panel comprises entering a first user authorization code into a keypad that is in communication with the security system control panel.

3. The method of claim 2, wherein upon determining that the first user authorization code is valid a system user is prompted to enter zone characteristic parameters into the keypad, thereafter the zone characteristic parameters are transmitted to the security control panel.

4. The method of claim 3, further including the step of saving the entered zone characteristic parameters in the security control panel.

5. The method of claim 4, wherein the entered zone characteristic parameters are transmitted from the security control panel to the network interface in response to a second activation code entered at the keypad.

6. The method of claim 5, wherein the network interface comprises a dedicated receiver that is accessed via at least one of a dedicated telephonic connection, a cellular communication connection and the Internet.

7. The method of claim 6, wherein the zone characteristic parameters include information pertaining to security system type, number of security zones in a structure, definition of each security zone in a structure, alpha descriptors that describe each zone, a reporting format for each zone and a reporting code for each zone.

8. A system for automatic security control panel configuration upload, comprising:

a keypad for inputting configuration information, said keypad comprising a first processor, a display device and a speaker device;

a security control panel in communication with the keypad for receiving the configuration information from said keypad, wherein the security control panel comprises a memory the configuration information are stored in memory;

a network interface in communication with the security control panel which receives the configuration information from the security control panel; and a central server in communication with the network interface, said central server receives the configuration information from the network interface.

9. The system of claim 8, wherein a first user authorization code is entered into the keypad.

10. The system of claim 9, wherein upon determining that the first user authorization code is valid, the keypad audibly and visually prompts a system user to enter the configuration information into the keypad.

11. The system of claim 10, wherein the first processor performs said determination.

12. The system of claim 8, wherein the entered configuration information are transmitted from the security control panel to the network interface in response to a second activation code entered at the keypad.

13. The system of claim 12, wherein the network interface comprises a dedicated receiver that is accessed via at least one of a dedicated telephonic connection, a cellular communication connection and the Internet.

14. The system of claim 8, wherein the configuration information includes zone characteristic parameters.

15. The system of claim 14, wherein the zone characteristic parameters include information pertaining to security system type, number of security zones in a structure, definition of each security zone in a structure, alpha descriptors that describe each zone, a reporting format for each zone and a reporting code for each zone.

* * * * *